US012729282B1

(12) United States Patent
Huang et al.

(10) Patent No.: US 12,729,282 B1
(45) Date of Patent: Sep. 8, 2026

(54) METHOD AND SYSTEM FOR EFFICIENT CATALYST-FREE ALCOHOLYSIS OF WASTE POLYESTER

(71) Applicant: JS Royal Home USA, Inc., Charlotte, NC (US)

(72) Inventors: Lei Huang, Jiangyin (CN); Zhang Pinfang, Shanghai (CN); Ding Linqin, Shaoxing City (CN)

(73) Assignee: JS Royal Home USA, Inc., Charlotte, NC (US)

( * ) Notice: Subject to any disclaimer, the term of this patent is extended or adjusted under 35 U.S.C. 154(b) by 0 days.

(21) Appl. No.: 19/201,909

(22) Filed: May 7, 2025

(51) Int. Cl.

| | |
|---|---|
| ***C08J 11/24*** | (2006.01) |
| ***B29B 17/04*** | (2006.01) |
| ***C08G 63/88*** | (2006.01) |
| ***C08J 11/12*** | (2006.01) |
| *B29B 17/00* | (2006.01) |
| *B29K 67/00* | (2006.01) |

(52) U.S. Cl.
CPC .......... *C08J 11/24* (2013.01); *B29B 17/0404* (2013.01); *C08G 63/88* (2013.01); *C08J 11/12* (2013.01); *B29B 2017/0015* (2013.01); *B29B 2017/046* (2013.01); *B29B 2017/0468* (2013.01); *B29K 2067/003* (2013.01); *C08J 2367/06* (2013.01)

(58) Field of Classification Search
USPC ................ 521/48.5; 528/190, 193, 194, 196
See application file for complete search history.

(56) References Cited

U.S. PATENT DOCUMENTS

2023/0242733 A1* 8/2023 Brons .................... C08J 11/24 521/48.5

FOREIGN PATENT DOCUMENTS

WO WO-2024094616 A1 * 5/2024 .......... C08G 63/199

* cited by examiner

*Primary Examiner* — Terressa Boykin
(74) *Attorney, Agent, or Firm* — Mark Young, PA

(57) ABSTRACT

An efficient, catalyst-free method and system for waste polyester alcoholysis via a two-stage process. Initially, molten waste polyester undergoes pre-alcoholysis in a multi-stage screw unit using a minimal amount (0.2%-10% mass ratio) of alcoholytic agent to achieve partial depolymerization and a specific intermediate viscosity. After filtration, this material proceeds to a deep alcoholysis stage in a separate reactor. Here, complete depolymerization occurs using a reduced quantity (1:0.1-0.6 mass ratio) of alcoholizer under strictly catalyst-free conditions. The system links the screw unit, filter, and alcoholysis reactor. This approach significantly reduces alcoholytic agent consumption, eliminates catalyst requirements, simplifies the recycling process, and enhances the potential for producing high-quality recycled polyester monomers or intermediates.

20 Claims, 3 Drawing Sheets

METHOD AND SYSTEM FOR EFFICIENT CATALYST-FREE ALCOHOLYSIS OF WASTE POLYESTER

FIELD OF THE INVENTION

This invention pertains generally to the field of polymer recycling, and more specifically, it details a novel method and integrated system for the alcoholysis of waste polyester materials. The described process significantly enhances efficiency by reducing the consumption of alcoholytic agents and notably eliminates the requirement for catalysts, thereby streamlining the recycling operation and improving the quality potential of the resulting recycled polyester monomers or oligomers.

BACKGROUND OF THE INVENTION

Polyester, particularly polyethylene terephthalate (PET), represents a class of linear polymers extensively utilized in the manufacturing of plastic products, packaging films, and synthetic fibers. The widespread use of polyester inevitably leads to the generation of substantial quantities of waste, posing significant environmental and resource management challenges. Globally, millions of tons of polyester waste are produced annually, with estimates suggesting figures around 30 million tons per year in China alone. Addressing this challenge necessitates effective recycling strategies. Current approaches broadly fall into physical regeneration and chemical regeneration categories.

Physical regeneration methods, involving steps such as washing, drying, and melt granulation, are often favored for their relative simplicity and lower operational costs. However, these methods frequently result in a degradation of the material's properties, such as reduced molecular weight and altered mechanical strength, due to thermal and shear stress during reprocessing. Furthermore, physical regeneration struggles to achieve true closed-loop recycling, especially when dealing with complex waste streams like mixed polyester textiles or heavily contaminated materials, often culminating in downcycled products or ultimately non-recyclable residues.

Chemical regeneration, conversely, exploits the reversible nature of the ester linkages within the polyester chain. This approach utilizes chemical depolymerization processes, employing small molecule degradation agents to break down the long polymer chains into their constituent monomers or valuable oligomeric intermediates. These depolymerized components can subsequently be purified to remove contaminants (dyes, additives, other polymers) and then repolymerized to produce high-quality recycled polyester, effectively closing the material loop. Common chemical regeneration techniques include hydrolysis (water degradation), methanolysis (methanol degradation), and glycolysis (glycol degradation). Hydrolysis and methanolysis often necessitate harsh reaction conditions, including high temperatures and pressures, which demand specialized, corrosion-resistant equipment and can lead to the formation of undesirable byproducts, thereby complicating the process and hindering widespread industrial adoption.

Glycolysis, the depolymerization of polyester using glycols (such as ethylene glycol, the monomer used in PET production), offers several advantages, including generally milder reaction conditions compared to hydrolysis or methanolysis, a potentially shorter process duration, high yields of desired products (like bis(2-hydroxyethyl) terephthalate—BHET), and suitability for continuous industrial production.

However, conventional glycolysis processes typically rely on the addition of catalysts to achieve acceptable reaction rates and yields. Common catalysts include metal acetates (e.g., zinc acetate), carbonates (e.g., potassium carbonate, sodium carbonate), and various organometallic compounds (e.g., titanium diol alkali metal coordination compounds), usually employed in concentrations ranging from 0.1% to 5% by weight relative to the polyester. The presence of these catalysts, while accelerating the reaction, introduces complications. Residual catalyst species in the depolymerized product can negatively impact the stability and quality of the subsequently repolymerized polyester, potentially causing unwanted side reactions or discoloration. Complete removal of these catalysts necessitates additional purification steps, adding complexity and cost to the overall recycling process. Moreover, many existing glycolysis methods require a significant excess of the glycolytic agent, often specifying mass ratios of glycol to waste polyester of 1:1 or even higher. This high ratio increases the consumption of the alcohol solvent, elevates the energy required for its subsequent recovery and purification (typically via distillation), and potentially increases the operating pressure needed for efficient separation.

Consequently, there remains a significant need in the art for an improved method and system for waste polyester alcoholysis that is efficient, economically viable, and environmentally sound. Specifically, a process that minimizes the consumption of the alcoholytic agent while entirely eliminating the need for catalysts would represent a substantial advancement, simplifying operations, reducing costs, and enhancing the intrinsic quality of the recycled monomers or intermediates produced.

SUMMARY OF THE INVENTION

The present invention addresses the aforementioned limitations by providing a novel method and a corresponding system for the efficient alcoholysis of waste polyester. This invention achieves complete or near-complete depolymerization of polyester into its constituent monomers and/or valuable intermediates under entirely catalyst-free conditions, while simultaneously requiring significantly reduced quantities of the alcoholytic agent compared to conventional approaches. The core of the invention lies in a strategically designed two-stage alcoholysis process. The first stage involves a pre-alcoholysis step where molten waste polyester is partially depolymerized using a minimal amount of an alcoholytic agent. This is followed by a second, deep alcoholysis stage where the pre-alcoholized, lower-viscosity material undergoes complete depolymerization, again without the use of any catalyst and using a further optimized, reduced amount of alcoholytic agent.

According to one aspect of the invention, a method for efficient catalyst-free alcoholysis of waste polyester is provided. The method comprises the steps of: performing a pre-alcoholysis reaction by contacting molten waste polyester material with an alcoholytic agent, wherein the mass ratio of the alcoholytic agent to the molten waste polyester material is carefully controlled within the range of 0.2% to 10%, to yield a pre-alcoholized material having a specific target intrinsic viscosity, preferably between 0.1 dL/g and 0.5 dL/g; and subsequently performing a deep alcoholysis reaction on the pre-alcoholized material after it has been subjected to fine filtration, wherein the filtered pre-alcoholized material is mixed with an additional quantity of an alcoholizer (which may be the same or different from the alcoholytic agent used in the pre-alcoholysis step, but is preferably the same) such that the mass ratio of the total alcoholizer present in this stage relative to the mass of the pre-alcoholized product fed into this stage is between 1:0.1 and 1:0.6. Critically, this deep alcoholysis step is conducted under catalyst-free conditions to completely depolymerize the material into its corresponding monomers and/or oligomeric intermediates.

According to another aspect of the invention, a system specifically configured for carrying out the efficient catalyst-free alcoholysis of waste polyester is provided. The system comprises, at its core, a multi-stage screw processing unit, such as a twin-screw extruder, adapted and configured for performing the pre-alcoholysis step. This unit is fluidly connected downstream to an alcoholysis reactor, typically an alcoholysis kettle, which is designed and operated for conducting the subsequent deep alcoholysis step under catalyst-free conditions. The system may be advantageously augmented with additional upstream and downstream processing units. Upstream components may include a pre-crystallization drying unit for preparing the feedstock and an intermediate silo for conditioned material storage. Downstream components may include a decanter or de-alcoholization kettle for separating excess alcoholytic agent from the depolymerized product, and a distillation unit for purifying the recovered alcohol solvent, enabling its efficient reuse within the process.

A key innovation enabling efficient, catalyst-free alcoholysis resides in the synergistic combination of the specific two-stage reaction strategy and optimized processing parameters within a suitably designed system. The pre-alcoholysis stage, preferably conducted within a three-stage screw extruder incorporating vacuum devolatilization capabilities, precisely controls the initial partial depolymerization. By targeting a specific, reduced viscosity range (0.1-0.5 dL/g) using only a minimal input of the alcoholytic agent (0.2%-10%), the material is prepared for the subsequent stage. The resulting low-viscosity oligomeric melt exhibits improved homogeneity and reactivity. The subsequent deep alcoholysis stage, acting on this pre-conditioned material, can then proceed efficiently to completion using a significantly lower amount of alcoholytic agent (mass ratio of 1:0.1-0.6 relative to the pre-alcoholized material) and, importantly, without the need for any added catalyst, under optimized temperature and pressure conditions. This carefully orchestrated two-stage approach fundamentally differs from single-step glycolysis or conventional catalytic two-stage methods, leading to substantial reductions in alcoholytic agent consumption, elimination of catalyst-related issues, and simplification of the overall recycling workflow.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, steps, parameters or flow shown in the figures.

DETAILED DESCRIPTION OF THE INVENTION

The present invention provides a significantly improved method and an integrated system designed for the efficient and cost-effective alcoholysis of waste polyester materials, overcoming key drawbacks of prior art processes by operating entirely without catalysts and with reduced consumption of the alcoholytic agent. The methodology is strategically divided into distinct pre-alcoholysis and deep alcoholysis stages, facilitated by a specifically configured processing system.

System for Efficient Catalyst-Free Alcoholysis of Waste Polyester

Figure 1:
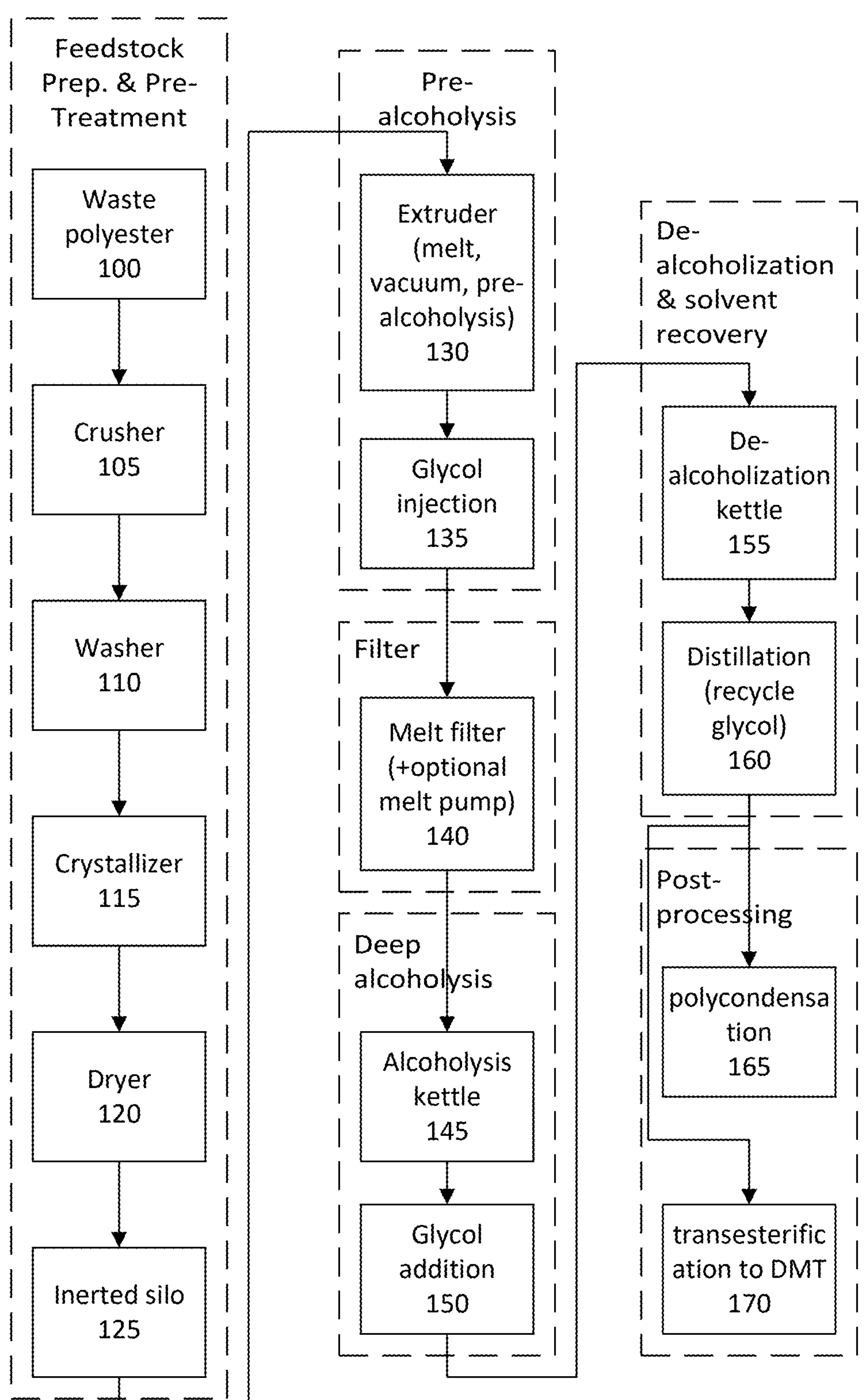
FIG. 1 is a conceptual system diagram illustrating the arrangement of key processing components within an embodiment of the system for efficient catalyst-free alcoholysis of waste polyester according to the present invention.

Referring conceptually to FIG. 1, an exemplary system configured according to the principles of the present invention incorporates several interconnected processing units arranged to execute the stages of the method efficiently.

An upstream pre-treatment section is preferably included to prepare the waste polyester feedstock 100. This section typically comprises a crystallizer 115 and drying unit 120. The function of this unit is to reduce the moisture content of the incoming waste polyester raw material 100 (which may be in the form of flakes, chips, or pellets derived from crushed 105 and cleaned 110 post-consumer or post-industrial sources) to a very low level, specifically less than 500 parts per million (ppm). This drying step is crucial as excess moisture can lead to undesirable hydrolysis side reactions during the high-temperature melting and alcoholysis stages, potentially affecting product quality and yield. Drying is typically achieved by heating the material, for instance, within a temperature range of 130° C. to 180° C. for a duration of 2 to 6 hours, often under a flow of dry air or inert gas. Following drying, the conditioned material may be transferred to an intermediate silo 125. This silo 125 serves not only as a buffer storage but can also be configured to maintain the low moisture content and prevent oxidative degradation of the polyester before it enters the subsequent processing stage, for example, by maintaining a nitrogen atmosphere (nitrogen-insulating oxygen treatment).

The heart of the system involves the pre-alcoholysis and deep alcoholysis stages. The pre-alcoholysis section prominently features a multi-stage, preferably co-rotating or counter-rotating twin-screw extruder, referred to herein as a three-stage screw unit 130. This unit 130 performs multiple functions sequentially. An initial feeding and melting zone receives the pre-treated polyester material and melts it through a combination of shear heating generated by the rotating screws and external heating applied to the extruder barrel. The operating temperature in this melting zone is typically maintained between 230° C. and 270° C. Following the melting zone, the molten polyester enters a vacuum devolatilization zone. This zone is connected to a vacuum system capable of achieving high vacuum levels, for instance, a pressure of −0.98 MPa (gauge) or lower (i.e., closer to absolute vacuum). The application of vacuum at elevated temperature (typically also between 230° C. and 270° C.) effectively removes residual moisture and other volatile impurities (e.g., trapped solvents, degradation byproducts) from the melt, further purifying the material and preventing interference with the alcoholysis reaction. The degassed molten polyester then progresses into the pre-alcoholysis reaction zone within the same screw unit. Here, a precisely metered amount of the alcoholytic agent (preferably ethylene glycol) is injected 135 and intensively mixed with the molten polyester. The amount of alcoholytic agent added at this stage is deliberately kept low, specifically within a mass ratio of 0.2% to 10% relative to the mass flow rate of the molten polyester. The combination of high temperature (again, typically 230° C. to 270° C.), intensive mixing provided by the screw elements, and the presence of the alcoholytic agent initiates partial depolymerization of the polyester chains. The residence time and process conditions within this zone are controlled such that the polyester is depolymerized to a target intermediate molecular weight, characterized by an intrinsic viscosity typically between 0.1 dL/g and 0.5 dL/g (as measured, for example, according to Chinese standard GB/T 14190-2017 using a 1:1 phenol/tetrachloroethane solvent mixture at a controlled temperature, e.g., 25° C. or 30° C., although standard testing temperatures might vary; the original text implies 90-100° C. might be relevant for the solvent mixture used, clarification needed if pursuing patent protection). A more preferred target viscosity range for the pre-alcoholized material might be 0.3-0.4 dL/g. The resulting low-viscosity pre-alcoholized material exits the screw extruder.

Before entering the next stage, the pre-alcoholized melt stream undergoes fine filtration. This is typically achieved using a melt filter 140, such as a candle filter assembly or a screen changer, equipped with filter media having a fine pore size, for example, a filtration precision of 8 to 15 microns. This filtration step removes any solid impurities, gels, or foreign particles that might be present in the waste stream or generated during processing. A melt pump may optionally be installed after the extruder or before/after the filter to ensure consistent pressure and flow rate of the pre-alcoholized material into the subsequent reactor.

The deep alcoholysis section of the system primarily comprises an alcoholysis reactor, often configured as a stirred tank reactor or an alcoholysis kettle, connected downstream to receive the filtered pre-alcoholized material. This reactor is where the final, complete depolymerization occurs. The alcoholysis kettle 145 is designed to operate under specific conditions conducive to catalyst-free alcoholysis. It is typically pre-charged or continuously fed with an additional amount of the alcoholysis agent (again, preferably ethylene glycol). The temperature within the kettle 145 is maintained within the range of 190° C. to 240° C., and the pressure is typically controlled between 0.07 MPa and 0.15 MPa (absolute or gauge not specified, but likely gauge, meaning slightly above atmospheric pressure). The temperature of the incoming alcoholysis agent 150 fed to the kettle might be pre-heated, for example, to 130-180° C. Crucially, the mass ratio of the total alcoholysis agent present in the kettle (including any carry-over with the pre-alcoholized feed plus the newly added agent) to the mass of the pre-alcoholized material being processed is maintained in the range of 1:0.1 to 1:0.6 (meaning 0.1 to 0.6 parts by mass of agent per 1 part by mass of pre-alcoholized material). Under these catalyst-free conditions, the low-viscosity pre-alcoholized oligomers react readily with the surrounding alcoholysis agent, breaking down further into the desired monomers (e.g., BHET) and/or other low molecular weight intermediates. The reaction is allowed to proceed until the viscosity of the product mixture reaches a very low value, typically less than or equal to 0.08 dL/g (measured using the same standard method as before), indicating extensive depolymerization.

Downstream of the alcoholysis kettle 140, a de-alcoholization and solvent recovery section is implemented. The product mixture from the alcoholysis kettle 145, containing the depolymerized polyester products and the excess alcoholysis agent, is fed into a de-alcoholization kettle 155 or evaporator (sometimes referred to as a decanter kettle, though its primary function here is evaporation). In this unit 155, the excess alcoholysis agent is removed from the depolymerized product mixture, typically via evaporation under controlled conditions. For example, atmospheric pressure evaporation might be employed at temperatures ranging from 210° C. to 260° C. for a residence time of 20 to 50 minutes. The vaporized alcohol solvent is then condensed and collected.

To enhance process economics and sustainability, the collected alcohol solvent is directed to a distillation unit 160. This unit 160 purifies the recovered solvent, removing any water, contaminants, or side-products, bringing it back to the required specification for reuse. The purified alcohol solvent is then recycled back to the process, providing makeup solvent for both the pre-alcoholysis stage (injection 135 into the screw unit 130) and the deep alcoholysis stage (feeding 150 into the alcoholysis kettle 145), thereby creating a closed loop for the solvent and minimizing overall consumption.

The final depolymerized product, after removal of the excess alcoholysis agent, consists primarily of monomers (like BHET) and potentially some oligomers. This purified alcoholysis liquid can then be utilized in various ways. It may undergo further purification steps if needed, potentially including another filtration step (e.g., using a 10-20 micron candle filter). One primary route is direct polycondensation 165 to produce high-quality regenerated polyester. This can often be done without adding traditional polycondensation catalysts, although minor amounts of catalysts like antimony compounds (e.g., antimony ethylene glycolate) might be added if desired to control reaction rate or final polymer properties. Before polycondensation, certain additives may be incorporated into the monomer/oligomer mixture to impart specific properties to the final polyester product. Examples include co-monomers for modifying polymer structure (like sodium 5-sulfoisophthalate dimethyl ester for dyeability or polyethylene glycol for flexibility) or flame retardants (such as benzoyl carboxylate propionate). The liquid-phase polycondensation reaction itself is typically carried out under high vacuum conditions (e.g., 100-300 Pa absolute pressure) and elevated temperatures (e.g., 275-290° C.) for a sufficient duration (e.g., around 25 minutes or longer, depending on the target molecular weight). Alternatively, the depolymerized product (particularly if rich in BHET) could be subjected to transesterification with methanol to produce dimethyl terephthalate (DMT) 170, another valuable chemical intermediate, which can then be purified and used for polyester synthesis.

Method for Efficient Catalyst-Free Alcoholysis of Waste Polyester

Figure 2:
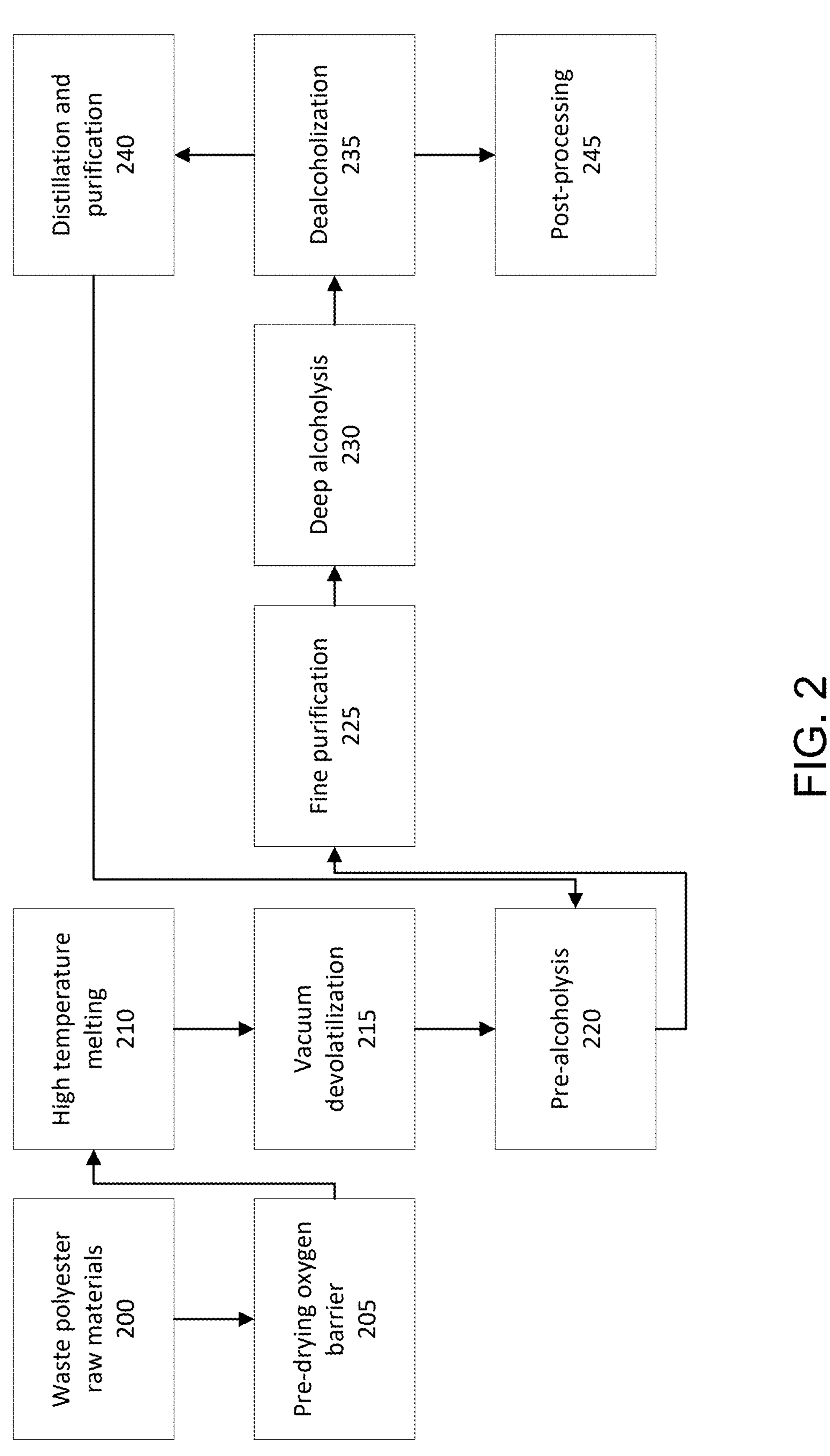
FIG. 2 is a schematic process flow diagram illustrating the sequence of operations in an embodiment of the method for efficient catalyst-free alcoholysis of waste polyester according to the present invention.
Figure 3:
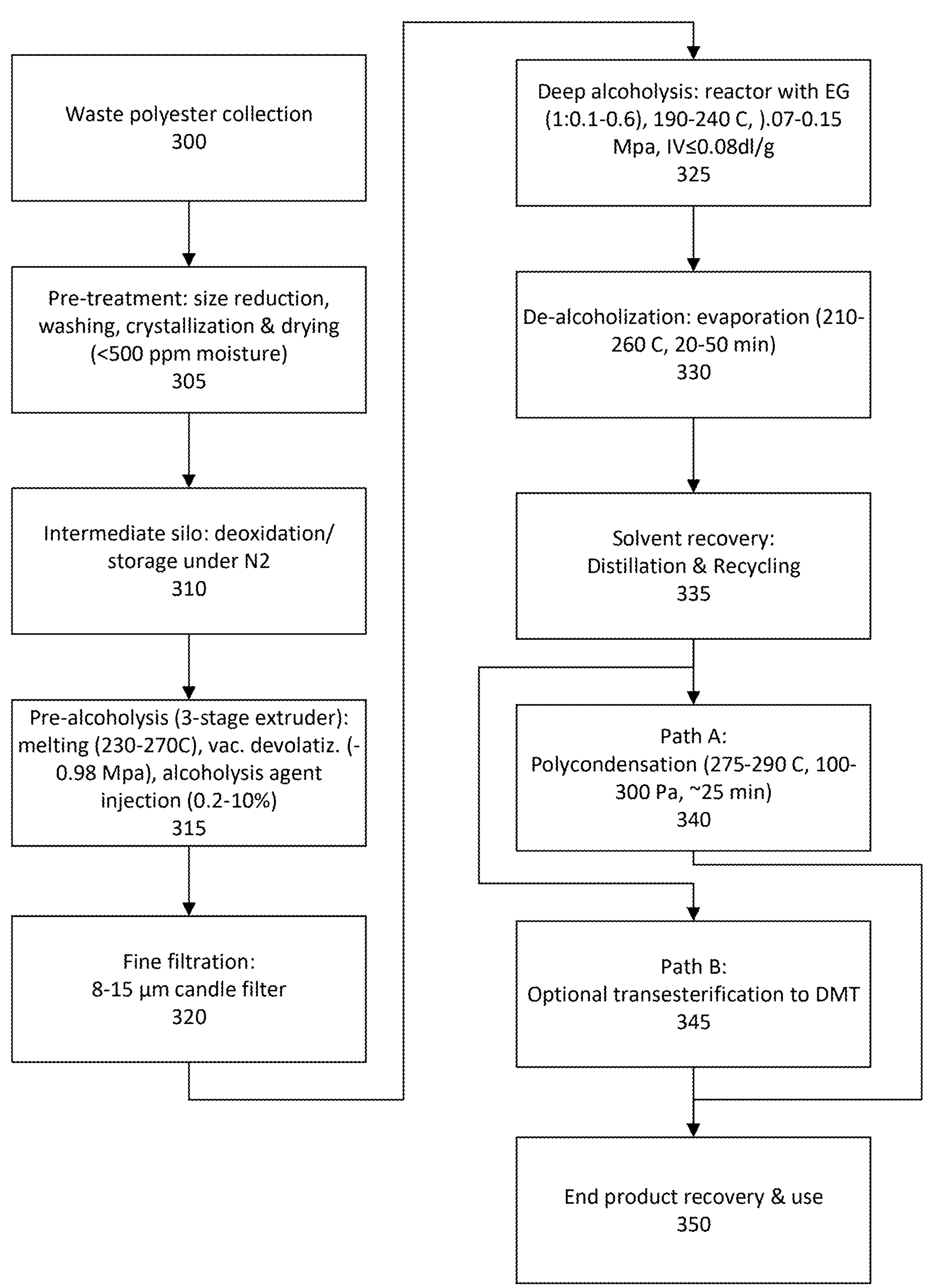
FIG. 3 is another schematic process flow diagram illustrating a sequence of operations, parameters and post processing steps in an embodiment of the method for efficient catalyst-free alcoholysis of waste polyester according to the present invention.

Following the flow depicted generally in FIG. 1, an exemplary method embodying the principles of the invention proceeds through the following operational steps, as conceptually illustrated in FIGS. 2 and 3. First, the waste polyester raw materials 200 undergo a pre-treatment sequence. This typically involves collection 300, initial size reduction (crushing or shredding) 305, followed by cleaning processes (washing) to remove surface contaminants like dirt, labels, and adhesives. The cleaned material then undergoes crystallization in a crystallizer 115 (a heat treatment unit that increases the crystallinity of amorphous PET, preventing sticking during subsequent drying) and thorough drying, for example, in the pre-crystallization drying unit described in the system section, operating at 130-180° C. for 2-6 hours, to achieve a target moisture content below 500 ppm. Subsequently, the dried material is subjected to deoxidation or oxygen exclusion 205, for instance, by storing and conveying it under a nitrogen atmosphere within the intermediate silo 310, before being fed to the next stage.

Second, the pre-treated waste polyester material is introduced into the pre-alcoholysis stage 315, executed within the three-stage screw unit. Inside the extruder, the material is first melted in the melting zone (e.g., at 230-270° C.) 210. The resulting melt then passes through the vacuum devolatilization zone (e.g., 230-270° C., pressure≤−0.98 MPa gauge) 215 where volatile impurities and residual moisture are effectively stripped away. In the subsequent pre-alcoholysis zone (e.g., 230-270° C.) 220, the molten, devolatilized polyester is intimately mixed with the alcoholytic agent (e.g., ethylene glycol) introduced at a controlled low mass ratio (0.2%-10% relative to the polyester mass). This initiates partial depolymerization, reducing the polymer's molecular weight and viscosity. The process is controlled to yield a pre-alcoholized material stream with a target intrinsic viscosity between 0.1 dL/g and 0.5 dL/g (preferably 0.3-0.4 dL/g). This resulting low-viscosity material is then passed through a fine filtration system (e.g., 8-15 micron precision candle filter) 320 to remove particulate impurities 225.

Third, the filtered pre-alcoholized material is transferred to the deep alcoholysis stage 230, conducted within the alcoholysis kettle (reactor) 325. This kettle is prepared by being pre-injected with or continuously receiving an appropriate amount of the alcoholysis agent (e.g., ethylene glycol), potentially preheated to 130-180° C. The pre-alcoholized material mixes with the agent in the kettle, ensuring the overall mass ratio of alcoholysis agent to the pre-alcoholized material is maintained within the range of 1:0.1 to 1:0.6. The reaction mixture is then held under catalyst-free conditions at a temperature between 190° C. and 240° C. and a pressure between 0.07 MPa and 0.15 MPa. Under these conditions, the alcoholysis reaction proceeds to completion, breaking down the oligomers into the desired monomers and/or low molecular weight intermediates, characterized by a final product viscosity of less than or equal to 0.08 dL/g.

Fourth, the resulting alcoholysis solution, containing the depolymerized products and excess alcoholysis agent, undergoes de-alcoholization 235. This typically involves feeding the solution into a de-alcoholization kettle or evaporator where the excess alcoholyte is removed by evaporation 330, for example, under atmospheric pressure at a temperature of 210-260° C. for a duration of 20-50 minutes.

Fifth, the alcohol solvent vapor recovered during the de-alcoholization step is subjected to purification 240, primarily through distillation 335. The purified alcohol solvent is then recycled and reused as the alcoholyte feed for both the pre-alcoholysis stage (in the screw unit) 220, 315 and the deep alcoholysis stage (in the kettle) 230, 325, thus significantly improving the process's resource efficiency and sustainability.

Sixth, the de-alcoholized product, which is the purified monomer/intermediate mixture, may undergo post-processing steps 245. Optionally the purified monomer/intermediate mixture may proceed directly to polycondensation 340. As described previously, this step can be tailored by adding specific additives before carrying out the polycondensation reaction under vacuum and high temperature (e.g., 100-300 Pa, 275-290° C., ~25 minutes) to produce regenerated polyester resin. Alternatively, the product may be further processed via other chemical routes, such as transesterification to DMT 345. These are two nonlimiting examples of post-processing steps. Other post-processing steps may be implemented to yield a useful end product 350, without departing from the scope of the invention.

The success of this method in achieving efficient alcoholysis without catalysts hinges on several integrated factors. The optimized reaction mechanism, facilitated by the controlled temperature and reactant ratios in each stage, plays a key role. The pre-alcoholysis step in the specialized three-stage screw unit, incorporating vacuum devolatilization, is critical. It not only removes interfering volatiles but also precisely controls the extent of initial depolymerization to achieve the target low viscosity using minimal alcoholytic agent. This reduction in viscosity significantly enhances the homogeneity and surface area available for reaction in the subsequent stage. The subsequent deep alcoholysis stage, operating on this uniform, low-viscosity oligomeric feed, can then proceed efficiently to completion under relatively mild, catalyst-free conditions using only a modest further amount of the alcoholysis agent. The separation of the process into these two distinct stages allows for the optimization of conditions specifically tailored to the requirements of each phase (partial depolymerization vs. complete depolymerization), ultimately leading to the observed benefits of drastically reduced overall alcoholysis agent consumption and the complete elimination of the need for catalysts, distinguishing it favorably from single-step or conventional catalytic processes.

Below a few non-limiting examples are described.

In Example 1, waste polyester bottle chips, characterized by an initial intrinsic viscosity of 0.85 dL/g, were processed according to the invention. The chips were first dried to <500 ppm moisture. They were then fed into a three-stage twin-screw extruder. Melting occurred at 260° C., followed by vacuum devolatilization at 260° C. and −0.98 MPa. In the pre-alcoholysis zone at 260° C., ethylene glycol was injected at a mass ratio of 0.7% relative to the polyester feed rate. The resulting pre-alcoholized material had an intrinsic viscosity of 0.35 dL/g and was filtered through a 10-micron filter. This material was fed into an alcoholysis kettle pre-charged with ethylene glycol (pre-heated to 160° C.). Additional ethylene glycol was added such that the total mass ratio of ethylene glycol to the incoming pre-alcoholized material in the kettle was 1:0.45. The deep alcoholysis reaction was conducted at 220° C. and 0.1 MPa pressure without any added catalyst. The resulting deep alcoholysis product exhibited an intrinsic viscosity of 0.048 dL/g.

In Example 2, using the same waste polyester bottle chips (initial viscosity 0.85 dL/g) and pre-treatment as in Example 1, the pre-alcoholysis was performed in the three-stage screw unit with ethylene glycol injected at a mass ratio of 0.5% relative to the polyester feed. The pre-alcoholized material viscosity was measured at 0.40 dL/g. After filtration, this material was fed to the alcoholysis kettle. Ethylene glycol was added such that the mass ratio of glycol to pre-alcoholized material in the kettle was 1:0.60. Deep alcoholysis was carried out catalyst-free at 225° C. and 0.12 MPa pressure. The final deep alcoholysis product showed an intrinsic viscosity of 0.050 dL/g.

As a Comparative Example, waste polyester material identical to that used in Examples 1 and 2 was processed using a conventional single-step catalytic approach for comparison. The dried waste polyester material was directly fed into an alcoholysis kettle along with ethylene glycol at a mass ratio of 1.3 relative to the polyester (i.e., glycol to polyester ratio of 1.3:1). Additionally, 0.5% by weight (relative to polyester) of zinc acetate catalyst was added. The reaction was conducted under conditions similar to the deep alcoholysis stage of the invention (e.g., 220° C., 0.1 MPa). The resulting alcoholysis product achieved an intrinsic viscosity of approximately 0.05 dL/g. This comparative example highlights that the present invention (Examples 1 and 2) achieves a comparable level of depolymerization (similar final viscosity) while completely eliminating the need for a catalyst and significantly reducing the total amount of ethylene glycol required (e.g., 0.7%+(0.45*100) %=~46% total in Example 1 vs. 130% in the Comparative Example, noting the percentages are calculated differently but the overall reduction is substantial).

Any measurable properties provided herein are intended as approximate specifications or properties for an exemplary embodiment and should not be construed as strictly limiting. Properties may be varied within reasonable limits without departing from the fundamental scope of the invention. Varied properties that do not substantially impair the intended utility of the invention are considered to be within the spirit and scope of the invention. Subject to the foregoing, unless explicitly specified otherwise within this disclosure, any quantified properties recited in a claim may be varied by at least ±5% without being considered outside the scope of the invention.

While an exemplary embodiment of the invention has been described in detail, it should be readily apparent to those skilled in the relevant art that numerous modifications and variations may be made thereto without departing from the true spirit and scope of the invention. With respect to the preceding description, it is to be understood that the optimum relationships for the components and steps of the invention, including potential variations in order, form, content, function, and manner of operation, are deemed readily apparent and obvious to one skilled in the art, and all equivalent relationships to those illustrated in the drawings and described in the specification are intended to be encompassed by the present invention. The preceding description and accompanying drawings are intended to be illustrative of potential modifications that can be made without straying from the fundamental principles of the present invention, the scope of which is to be limited only by the claims that follow. Therefore, the foregoing is to be considered as illustrative only of the principles of the invention. Further, since numerous modifications and changes will readily occur to those skilled in the art, it is not desired to limit the invention to the exact construction and operation as shown and described herein, and accordingly, all suitable modifications and equivalents are intended to fall within the scope of the invention as claimed in the appended claims.

What is claimed is:

1. A method for efficient catalyst-free alcoholysis of waste polyester, the method comprising the steps of:

performing a pre-alcoholysis reaction by contacting molten waste polyester material with a first quantity of an alcoholytic agent within a screw processing unit, wherein the mass ratio of said first quantity of the alcoholytic agent to the molten waste polyester material is between 0.2% and 10%, said contacting being performed under conditions sufficient to yield a pre-alcoholized material having an intrinsic viscosity between 0.1 dL/g and 0.5 dL/g;

filtering the pre-alcoholized material to obtain a fine-filtered pre-alcoholized product; and performing a deep alcoholysis reaction by contacting the fine-filtered pre-alcoholized product with a second quantity of an alcoholizer within an alcoholysis reactor separate from the screw processing unit, wherein the mass ratio of the total alcoholizer present during said deep alcoholysis reaction relative to the mass of the fine-filtered pre-alcoholized product is between 1:0.1 and 1:0.6, and wherein said deep alcoholysis reaction is conducted under catalyst-free conditions to obtain depolymerized products comprising corresponding monomers and/or intermediates.

2. The method according to claim 1, wherein the pre-alcoholysis step (a) is performed in a three-stage screw unit comprising a melting zone, a vacuum de-volatilization zone, and a pre-alcoholysis reaction zone integrated sequentially therein.

3. The method according to claim 1, wherein the alcoholytic agent used in step (a) and the alcoholizer used in step (c) are both ethylene glycol.

4. The method according to claim 3, wherein the melting zone operates at a temperature between 230° C. and 270° C.

5. The method according to claim 3, wherein the vacuum de-volatilization zone operates at a temperature between 230° C. and 270° C. and at a pressure of −0.98 MPa gauge or lower.

6. The method according to claim 3, wherein the pre-alcoholysis reaction zone operates at a temperature between 230° C. and 270° C.

7. The method according to claim 1, further comprising, prior to step (a), pre-treating the waste polyester material by drying it in a pre-crystallization drying unit to achieve a moisture content of less than 500 ppm, and subsequently storing or conveying the dried waste polyester material under a nitrogen atmosphere before feeding it into the screw processing unit.

8. The method according to claim 1, wherein the deep alcoholysis reaction in step (c) occurs in an alcoholysis kettle, wherein said alcoholysis kettle is pre-injected with or continuously receives at least a portion of the second quantity of the alcoholizer at a temperature between 130° C. and 180° C., and wherein the conditions for the deep alcoholysis reaction include a temperature between 190° C. and 240° C. and a pressure between 0.07 MPa and 0.15 MPa.

9. The method according to claim 1, further comprising, after step (c), feeding the resulting alcoholysis solution containing the depolymerized products and excess alcoholizer into a de-alcoholization kettle and evaporating the excess alcoholizer at atmospheric pressure at a temperature between 210° C. and 260° C. for a duration of 20 to 50 minutes.

10. The method according to claim 9, further comprising collecting the excess alcoholizer evaporated in the de-alcoholization kettle, purifying the collected alcoholizer by distillation, and reusing the purified alcoholizer as at least part of the first quantity of alcoholytic agent in step (a) or the second quantity of alcoholizer in step (c).

11. The method according to claim 9, further comprising subjecting the de-alcoholized depolymerized products to direct polycondensation to produce regenerated polyester.

12. The method according to claim 1, wherein the pre-alcoholysis reaction in step (a) is controlled to yield a pre-alcoholized material having an intrinsic viscosity between 0.3 dL/g and 0.4 dL/g.

13. The method according to claim 1, wherein the filtering in step (b) is performed using a candle filter having a filtration precision between 8 microns and 15 microns.

14. A method for recycling waste polyester comprising:

melting waste polyester feedstock to produce molten polyester;

removing volatile components from the molten polyester under vacuum;

introducing an alcoholytic agent into the molten polyester while mixing the molten polyester to partially depolymerize the polyester and form a pre-alcoholized material;

filtering the pre-alcoholized material to remove particulate contaminants;

introducing the filtered pre-alcoholized material into an alcoholysis reactor containing an alcoholysis agent; and performing catalyst-free alcoholysis of the filtered pre-alcoholized material to produce depolymerized polyester monomers or oligomers.

15. The method of claim 14, further comprising drying the waste polyester feedstock prior to melting to reduce moisture content to less than 500 ppm.

16. The method of claim 14, further comprising maintaining the dried waste polyester feedstock in an oxygen-isolated environment prior to melting.

17. The method of claim 14, further comprising evaporating excess alcoholytic agent from a reaction mixture produced by the alcoholysis reactor.

18. The method of claim 17, further comprising distilling the evaporated alcoholytic agent to produce purified alcoholytic agent and recycling the purified alcoholytic agent to at least one alcoholysis stage of the method.

19. The method of claim 14, further comprising performing polycondensation of the depolymerized polyester monomers or oligomers under vacuum to produce regenerated polyester.

20. The method of claim 19, further comprising introducing at least one polymer-modifying additive prior to the polycondensation step to modify properties of the regenerated polyester.

* * * * *